(12) United States Patent
Smolinske et al.

(10) Patent No.: US 7,324,449 B2
(45) Date of Patent: Jan. 29, 2008

(54) METHOD AND APPARATUS FOR DYNAMIC BACKHAUL RESOURCE MANAGEMENT IN A WIRELESS COMMUNICATION SYSTEM

(75) Inventors: Jeffrey C. Smolinske, Schaumburg, IL (US); Jyoti N. Black, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 22 days.

(21) Appl. No.: 10/798,926

(22) Filed: Mar. 11, 2004

(65) Prior Publication Data

US 2005/0201289 A1  Sep. 15, 2005

(51) Int. Cl.
*H04L 12/427* (2006.01)

(52) U.S. Cl. .................. 370/232; 370/236.1; 370/335; 370/468; 455/452.2

(58) Field of Classification Search ............. 370/230.1, 370/236, 230, 235, 233, 232, 236.1; 455/452.2
See application file for complete search history.

(56) References Cited

U.S. PATENT DOCUMENTS

| | | | |
|---|---|---|---|
| 5,999,817 A | | 12/1999 | Posti et al. |
| 6,370,185 B1 * | | 4/2002 | Schmutz et al. ............ 375/214 |
| 6,480,504 B1 * | | 11/2002 | Wang et al. ................. 370/442 |
| 6,496,694 B1 * | | 12/2002 | Menon et al. ............ 455/426.2 |
| 6,532,236 B1 * | | 3/2003 | De Vriendt ............... 370/395.1 |
| 6,687,226 B1 * | | 2/2004 | Galyas ........................ 370/231 |
| 6,873,597 B1 * | | 3/2005 | King .......................... 370/235 |
| 7,127,661 B2 * | | 10/2006 | Yoon et al. .................. 714/774 |
| 2002/0110112 A1 | | 8/2002 | Tuomi |
| 2003/0231655 A1 * | | 12/2003 | Kelton et al. ............... 370/468 |
| 2003/0235178 A1 * | | 12/2003 | Cai ............................. 370/342 |
| 2005/0159165 A1 * | | 7/2005 | Argyropoulos et al. .. 455/452.2 |

* cited by examiner

*Primary Examiner*—Edan D Orgad
*Assistant Examiner*—Jay P. Patel
(74) *Attorney, Agent, or Firm*—Jeffrey K. Jacobs

(57) ABSTRACT

Various embodiments are described to address the need to lower backhaul costs for EGPRS operators while maintaining the low and constant delay characteristics they require. 20 msec TRAU frames (221-226) are still used for backhaul to maintain the low and constant delay. However, to eliminate the restriction of mapping TRAU timeslots to air timeslots (211-218) one-to-one, the TRAU slots are collectively treated as a one large 20 msec TRAU frame for a group of air timeslots. The data for the air timeslots can be packed efficiently into this giant TRAU frame, ignoring backhaul timeslot boundaries. In this way, the appropriate amount of backhaul for the carrier can be allocated and the data for the air interface timeslots more efficiently packed into the backhaul.

16 Claims, 3 Drawing Sheets

METHOD AND APPARATUS FOR DYNAMIC BACKHAUL RESOURCE MANAGEMENT IN A WIRELESS COMMUNICATION SYSTEM

FIELD OF THE INVENTION

The present invention relates generally to wireless communication systems and, in particular, to dynamically managing backhaul resources.

BACKGROUND OF THE INVENTION

In General Packet Radio Service (GPRS) systems, packet control units implement the GPRS air interface protocol. PCUs are typically located remotely from the base transceiver stations (BTSs), usually at a base station controller (BSC) or mobile switching center (MSC) location. Constant and very low delay backhaul is required between a PCU and BTS to allow the PCU to transfer radio link control (RLC) blocks in real time over the air interface via the BTS. This backhaul is typically implemented as leased E1 lines and is usually very expensive to the operator.

In GPRS, this backhaul was pre-existing as long as air interface timeslots were switchable between circuit switched and GPRS service and there was no additional backhaul cost to the operator. However, with the advent of the Enhanced Data for GSM Evolution (EDGE) protocol for GPRS, also known as EGPRS, with data rates up to 59.2 Kbps per air interface timeslot, roughly 4x backhaul per air timeslot is required. This additional backhaul requirement for EDGE represents a very large ongoing cost for operators.

Existing "TRAU" backhaul is low delay and constant delay but is inefficient. (Strictly speaking TRAU frames are Transcoder/Rate Adaptor Unit frames, but "TRAU" is used herein to also encompass frames conveyed between a channel coder and PCU, since such frames are formatted in a similar fashion to Transcoder/Rate Adaptor Unit frames.) Existing "TRAU" backhaul wastes bandwidth by packing variable length (~30 octet to ~160 octet) RLC blocks into 160 octet, fixed-length TRAU frames. In contrast, packet backhaul is efficient and low delay but not constant delay. Furthermore, asynchronous transfer mode (ATM) backhaul may be efficient and low delay but not constant delay, or ATM backhaul may be low delay and constant delay but inefficient (depending upon the adaptation layer and data packing used). Generally, then, voice over packet/ATM systems are efficient and approximately constant delay but involve some additional delay over existing "TRAU" backhaul. However, this additional delay is intolerable to the GPRS protocol performance and is very difficult to keep small with the highly variable packet lengths of GPRS.

Therefore, a need exists for an apparatus and method of dynamically managing backhaul resources in order to lower the backhaul costs for EDGE operators while maintaining the low delay and constant delay characteristics required to support remote PCU location.

DETAILED DESCRIPTION OF EMBODIMENTS

Various embodiments are described below to address the need to lower backhaul costs for EGPRS operators while maintaining the low and constant delay characteristics they require. 20 msec TRAU frames are still used for backhaul to maintain the low and constant delay. However, to eliminate the restriction of mapping TRAU timeslots to air timeslots one-to-one, the TRAU slots are collectively treated as one large 20 msec TRAU frame for a group of air timeslots to the BTS. The data for the air timeslots can be packed efficiently into this giant TRAU frame, ignoring backhaul timeslot boundaries. In this way, the appropriate amount of backhaul can be allocated and the data for the air interface timeslots more efficiently packed into the backhaul. In general, embodiments of the present invention adjust the coding schemes of the RLC blocks so that all RLC blocks will fit into the giant TRAU frame. This can be done differently for every 20 msec giant TRAU frame, if desired. Finally, the mobiles with the lowest QoS priority can have their coding schemes lowered first, with sharing in round robin fashion when mobiles have identical QoS priorities.

Embodiments of the present invention encompass a method for dynamic backhaul resource management in a wireless communication system. The method comprises determining, by a packet control unit (PCU), a link capacity of a backhaul link for conveying data to be transmitted during a transmit period and determining a data traffic level, which is an amount of data that will need to be conveyed by the backhaul link for transmission during the transmit period, assuming that wireless unit coding schemes are maximized according to present wireless channel conditions. When the data traffic level is greater than the link capacity, the method further comprises reducing a coding scheme of at least one wireless unit for the transmit period in order to reduce the data traffic level to fit within the data capacity of the backhaul link.

Embodiments of the present invention also encompass a PCU that comprises a PCU network interface, adapted to send and receive messaging using a plurality of communication protocols, and a controller, communicatively coupled to the PCU network interface. The controller is adapted to determine a link capacity of a backhaul link for conveying data to be transmitted during a transmit period and adapted to determine a data traffic level which is an amount of data that will need to be conveyed by the backhaul link via the PCU network interface for transmission during the transmit period, assuming that wireless unit coding schemes are maximized according to present wireless channel conditions. The controller is also adapted to reduce a coding scheme of at least one wireless unit for the transmit period, when the data traffic level is greater than the link capacity, in order to reduce the data traffic level to fit within the data capacity of the backhaul link.

Figure 1:
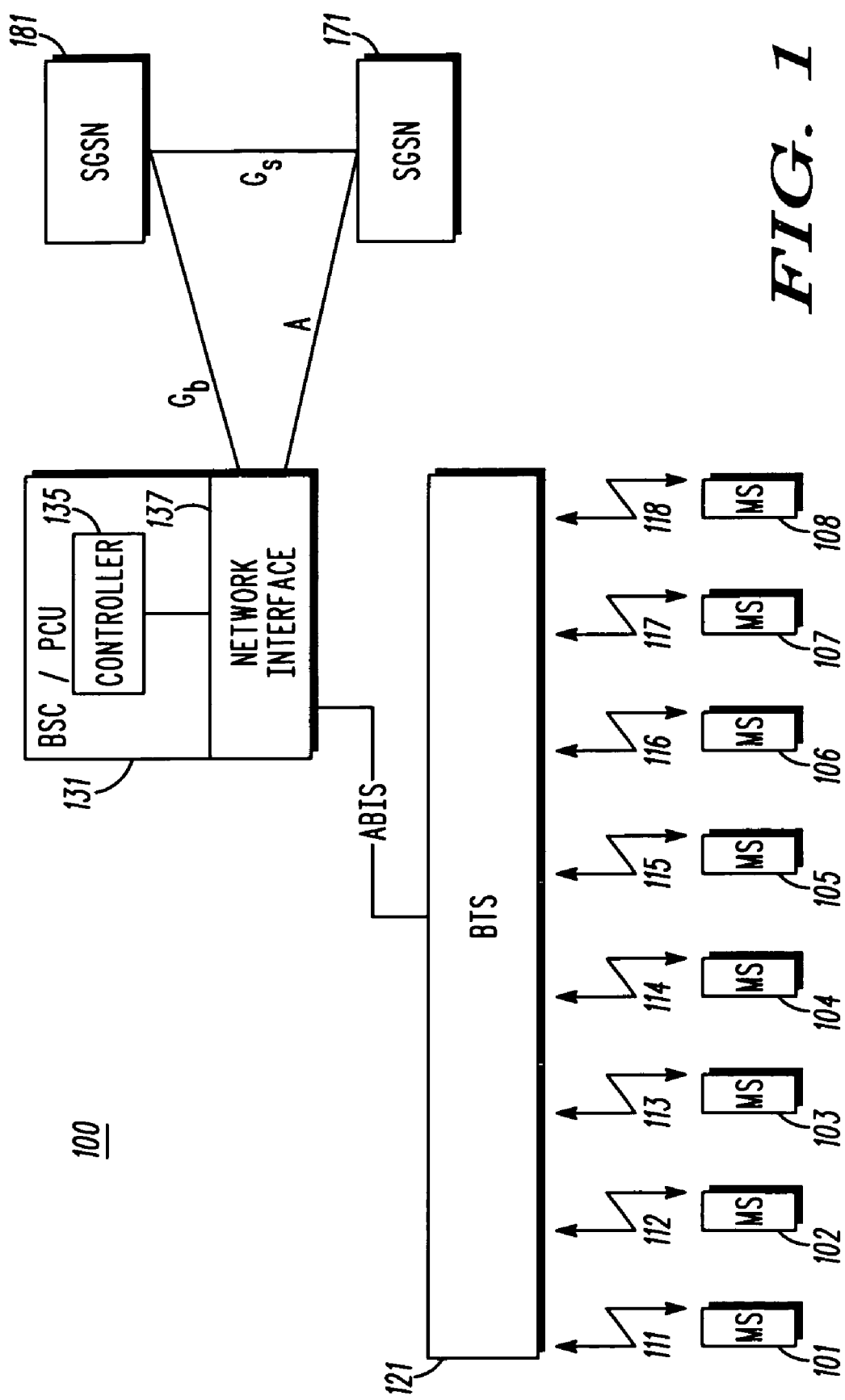
FIG. 1 is a block diagram depiction of a wireless communication system in accordance with multiple embodiments of the present invention.
Figure 2:
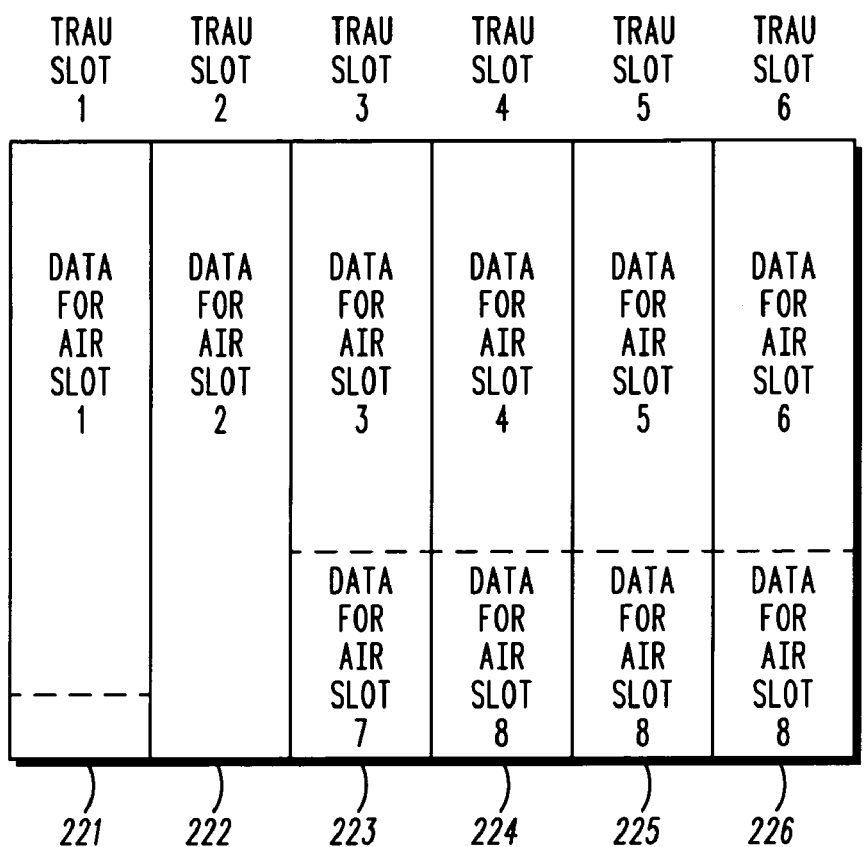
FIG. 2 is a block diagram depiction of an exemplary allocation of "TRAU" or backhaul slots to data portions targeted for transmission in specific air interface timeslots.
Figure 2:
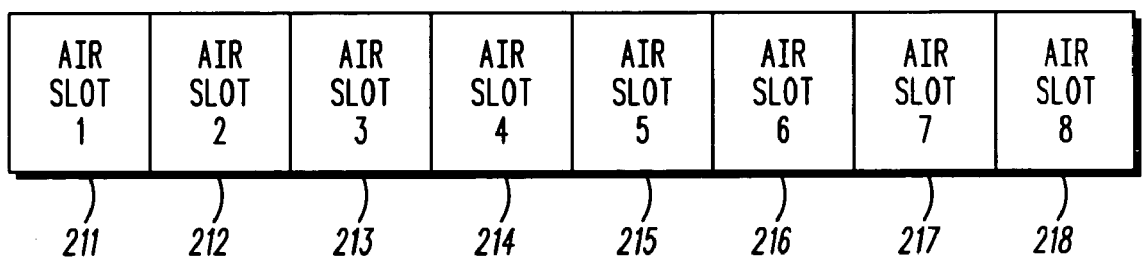
Figure 3:
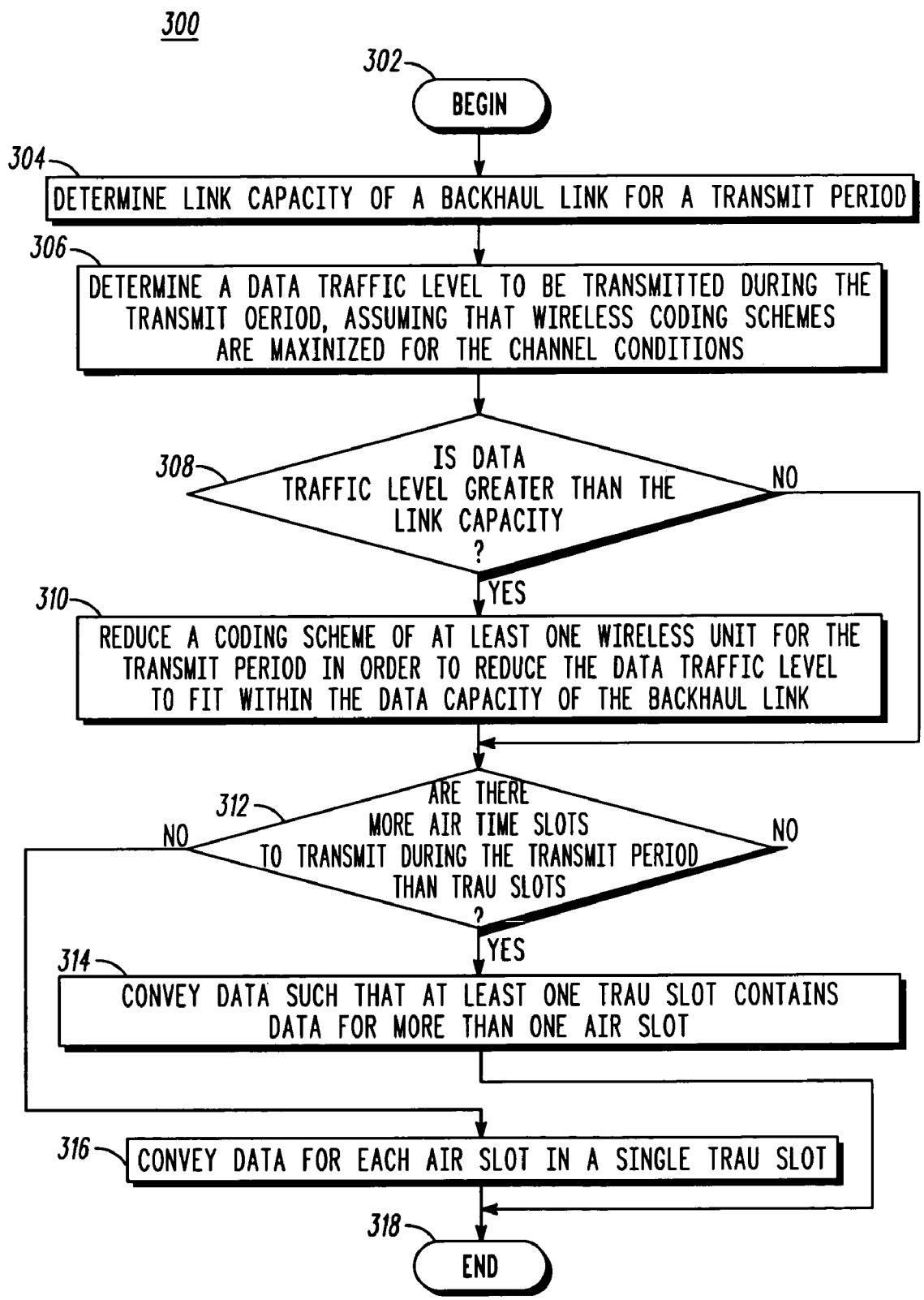
FIG. 3 is a logic flow diagram of functionality performed by a PCU in accordance with multiple embodiments of the present invention.

The disclosed embodiments can be more fully understood with reference to FIGS. 1-3. FIG. 1 is a block diagram depiction of wireless communication system 100 in accordance with multiple embodiments of the present invention. Communication system 100 is a well-known, EDGE-capable, GPRS system. System 100 is based on the applicable 3GPP (Third Generation Partnership Project) standards, suitably modified to implement the present invention. However, embodiments of the present invention are not necessarily limited to GPRS systems but may also include communication systems that employ other technologies similar to GPRS.

Those skilled in the art will recognize that FIG. 1 does not depict all of the network equipment necessary for system 100 to operate but only those system components and logical entities particularly relevant to the description of embodiments of the present invention. In particular, the network equipment of system 100 comprises components such as BTS 121, MSC 171, BSC/PCU 131, and serving GPRS support node (SGSN) 181. Generally, BTSs, BSC/PCUs, MSCs, and SGSNs are known in the art. For example, BSC/PCUs are well-known to comprise components such as controllers and network interfaces. Moreover, the interfaces between BTSs, BSC/PCUs, MSCs, and SGSNs are known in the art. For example, the Abis, A, and Gb interfaces between BSC/PCU 131 and the respective components BTS 121, MSC 171, and SGSN 181 are well-known. Also, the Gs interface between MSC 171 and SGSN 181 is well-known.

Finally, although FIG. 1 depicts the PCU of system 100 as implemented with the BSC, the present invention is not limited to such embodiments. For example, the PCU could alternatively be implemented with the SGSN, with the MSC, or as an independent system component. Such variances in system architecture are not particularly relevant nor limiting to the present invention.

BSC/PCU 131 is depicted in FIG. 1 as comprising controller 135 and network interface 137. In general, components such as controllers and network interfaces are well-known. For example, such controllers are known to comprise basic components such as, but not limited to, microprocessors, microcontrollers, memory devices, and/or logic circuitry. Moreover, such components are typically adapted to implement algorithms and/or protocols that have been expressed using high-level design languages or descriptions, expressed using computer instructions, expressed using messaging flow diagrams, and/or expressed using logic flow diagrams. Thus, given an algorithm, a logic flow, a messaging flow, and/or a protocol specification, those skilled in the art are aware of the many design and development techniques available to implement a controller that performs the given logic. Therefore, BSC/PCU 131 represents a known BSC/PCU that has been adapted, in accordance with the description herein, to implement multiple embodiments of the present invention.

BTS 121 uses GPRS air interfaces 111-118 for communication with remote units 101-108, respectively. GPRS terminology refers to remote units as mobile stations (MSs); however, remote units are not necessarily mobile or able to move. Thus, remote unit/MS platforms are known in the art to include devices such as mobile phones, computers, personal digital assistants, gaming devices, etc.

Operation of embodiments in accordance with the present invention occurs substantially as follows. FIG. 2 is a block diagram depiction of an exemplary allocation of "TRAU" or backhaul slots to data portions targeted for transmission in specific air interface timeslots. As an example to illustrate certain aspects of the present invention, a number of assumptions underlie the details of diagram 200. First, air interface timeslots 211-218 correspond to eight 20 millisecond timeslots that are to be transmitted concurrently to each respective MS 101-108. Second, backhaul timeslots (or TRAU slots) 221-226 represent six 20 millisecond E1 timeslots that concurrently convey data from PCU 131 to BTS 121.

In existing systems, the data for each air interface timeslot is conveyed by a single, dedicated TRAU slot, and each TRAU slot conveys data for a single air interface timeslot. However, embodiments of the present invention provide for dynamic backhaul resource management to more efficiently use backhaul timeslots. For a given transmit period (i.e., a 20 msec air interface timeslot period), controller 135 determines a backhaul link capacity for conveying the data to BTS 121 for transmission over the air interface. Specifically, controller 135 determines the number of available backhaul timeslots (or 20 msec TRAU frames) on the bearer portion of the PCU-BTS link (i.e., the Abis link). In the example illustrated by diagram 200, there will always be six TRAU slots available (unless a hardware failure occurs). In alternative embodiments, however, the TRAU slots may be dynamically allocated rather than dedicated and thus the capacity will vary. Therefore, with the number of available 64 Kbps TRAU slots determined, the link capacity is known.

Controller 135 also determines a data traffic level for the given transmit period. This is the amount of data that will need to be conveyed by the backhaul link for transmission by BTS 121 during the transmit period. The traffic level determination is performed first by assuming that each of the MSs 101-108 uses the maximum coding scheme that the wireless channel conditions of each MS allows. When this data traffic level is greater than the link capacity, controller 135 reduces the coding scheme of one or more of the MSs 101-108 for the given transmit period. This reduction may involve merely reducing the transmission data rate to one or more MSs, or it may involve not conveying data to one or more MSs at all during the given transmit period.

Controller 135 does this coding scheme reduction in order to reduce the total data traffic level to fit within the data capacity of the backhaul link. Which MSs are selected for coding scheme reduction and how much each is reduced can be determined in many ways depending on the performance measures that one desires to optimize. For example, where optimal data throughput is desired, a "best fit" algorithm can be used to determine how to "size" the data blocks (i.e., adjust coding schemes) to most efficiently pack the available TRAU slots.

This can be appreciated visually by noting the importance of block sizing to efficiently packing backhaul slots 221-226 in diagram 200. For example, if the channel conditions of MS 108 allow it to receive data at the maximum coding scheme, its coding scheme could be reduced in order to reduce the amount of data that needs to be conveyed to BTS 121 for air slot 218. This data rate reduction, then, allows the reduced amount of data to fit into the remaining portion of TRAU slot 226.

In addition to data throughput, a "best fit" algorithm may be tailored to consider one or more quality of service (QoS) parameters of the MSs as well. Thus, the MSs may be prioritized based on their QoS parameters, and one or more of the lowest priority MSs selected for coding scheme reduction. In the example of FIG. 2, both MS 102 and MS 108 have channel conditions allowing them to receive data at the maximum coding scheme. However, MS 108 has the lowest QoS of MSs 101-108. MS 108 may be selected instead of MS 102, therefore, for a coding scheme reduction for the present timeslot.

As noted above, in existing systems, the data for each air interface timeslot is conveyed by a single, dedicated TRAU slot and each TRAU slot conveys data for a single air interface timeslot. In embodiments of the present invention, controller 135 may convey, via network interface 137, data targeted for a single air interface timeslot via multiple TRAU slots or may convey data targeted for multiple air interface timeslots via a single TRAU slot. Thus, in addition to determining whether coding schemes need to be reduced, controller 135 dynamically manages the backhaul timeslot resources to convey data to as many MSs as the backhaul link capacity allows. In other words, embodiments of the present invention are not limited in the number of MSs that can be concurrently supported simply by the number of TRAU slots available.

For example, diagram 200 also illustrates a situation in which no coding scheme reductions are needed. Instead, there are simply more MS air slots (eight) than TRAU slots (six). In the prior art, only six of the eight air interface timeslots could be concurrently supported. In embodiments of the present invention, however, backhaul slot resources are dynamically managed such that the data for the two additional MSs (MSs 107 and 108, e.g.) is allocated to already assigned TRAU slots (slots 223-226, e.g.). Thus, more MS air slots can be concurrently supported than in the prior art.

FIG. 3 is a logic flow diagram of functionality performed by a PCU in accordance with multiple embodiments of the present invention. Logic flow 300 begins (302) when, for a given transmit period (i.e., for an air interface timeslot), the PCU determines (304) a backhaul link capacity for conveying data to be transmitted during the air slot. The PCU also determines (306) a data traffic level, which is an amount of data that will need to be conveyed by the backhaul link for transmission during the air slot. This data traffic determination assumes that wireless unit coding schemes are maximized according to their present wireless channel conditions.

If (308) the data traffic level is greater than the link capacity, the PCU reduces (310) the coding scheme of one or more wireless units during the air slot in order to reduce the data traffic level to fit within the data capacity of the backhaul link. Also, if (312) there are more air timeslots to transmit during the transmit period than backhaul slots to convey the data, the PCU will convey (314) the data such that at least one backhaul slot contains data for more than one air timeslot. Otherwise, in some but not all embodiments of the present invention, the PCU will convey (316) the data for each air timeslot in a single backhaul slot, and the logic flow ends (318).

Embodiments of the present invention, as described herein, improve the efficiency of the EDGE backhaul while maintaining the essential backhaul characteristics of extremely low and constant delay, as necessary to support the remote location of the PCU. The current TRAU backhaul solution is inefficient in that it packs variable-length RLC blocks into fixed-length TRAU frames. Embodiments of the present invention allow efficient packing of RLC blocks into one giant TRAU frame for a group of air timeslots. Considering that the average RLC block size among all RLC blocks on a given carrier is typically 60% of the maximum RLC block size, an overall backhaul savings on the order of 40-60% is possible. Using embodiments of the present invention, an operator can also trade off backhaul cost versus peak throughput for EGPRS users in the system. For example, the operator can deliberately choose even greater backhaul savings by lowering average peak throughput for its EGPRS users.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for dynamic backhaul resource management in a wireless communication system comprising:
   determining, by a packet controller, a link capacity of a backhaul link for conveying data to be transmitted during a transmit period;
   determining, by the packet controller, a data traffic level which is an amount of data that will need to be conveyed by the backhaul link for transmission during the transmit period, assuming that wireless unit coding schemes are maximized according to present wireless channel conditions;
   when the data traffic level is greater than the link capacity, reducing a coding scheme of at least one wireless unit for the transmit period in order to reduce the data traffic level to fit within the data capacity of the backhaul link;
   conveying data targeted for an air interface timeslot for the transmit period via multiple backhaul link timeslots.

2. The method of claim 1, wherein the transmit period comprises a period in which a plurality of air interface timeslots are concurrently transmitted.

3. The method of claim 1, wherein the backhaul link comprises a packet controller-BTS bearer link between the packet controller and a base transceiver station (BTS).

4. The method of claim 3, wherein the packet controller BTS bearer link comprises 20 millisecond backhaul frames.

5. The method of claim 1, wherein reducing the coding scheme of at least one wireless unit for the transmit period comprises not conveying data to the at least one wireless unit during the transmit period.

6. The method of claim 1, wherein reducing the coding scheme of at least one wireless unit for the transmit period comprises reducing the data rate at which data will be transmitted to the at least one wireless unit during the transmit period.

7. The method of claim 1, wherein each backhaul link timeslot of the multiple backhaul link timeslots is also used to convey data targeted for at least one other air interface timeslot.

8. The method of claim 1, wherein conveying data targeted for an air interface timeslot via multiple backhaul link timeslots is performed when an available number of backhaul link timeslots is less than a number of targeted air interface timeslots.

9. The method of claim 1, wherein the at least one wireless unit has a lowest QoS priority as compared to other wireless units targeted with data during the transmit period.

10. A packet controller for dynamic backhaul resource management in a wireless communication system, the packet controller comprising:
   a packet controller network interface adapted to send and receive messaging using a plurality of communication protocols;
   a controller, communicatively coupled to the packet controller network interface,
      adapted to determine a link capacity of a backhaul link for conveying data to be transmitted during a transmit period,
      adapted to determine a data traffic level which is an amount of data that will need to be conveyed by the backhaul link via the packet controller network interface for transmission during the transmit period, assuming that wireless unit coding schemes are maximized according to present wireless channel conditions, and
      adapted to reduce a coding scheme of at least one wireless unit for the transmit period, when the data traffic level is greater than the link capacity, in order to reduce the data traffic level to fit within the data capacity of the backhaul link, wherein the controller is further adapted to convey, via the packet controller network interface, data targeted for an air interface timeslot for the transmit period via multiple backhaul link timeslots.

11. The packet controller of claim 10, wherein the transmit period comprises a period in which a plurality of air interface timeslots are concurrently transmitted.

12. The packet controller of claim 10, wherein the backhaul link comprises a packet controller-BTS bearer link between the packet controller and a base transceiver station (BTS).

13. The packet controller of claim 12, wherein the packet controller-BTS bearer link comprises 20 millisecond backhaul frames.

14. The packet controller of claim 10, wherein each backhaul link timeslot of the multiple backhaul link timeslots is also used to convey data targeted for at least one other air interface timeslot.

15. The packet controller of claim 10, wherein the controller conveys data targeted for an air interface timeslot via multiple backhaul link timeslots when an available number of backhaul link timeslots is less than a number of targeted air interface timeslots.

16. The packet controller of claim 10, wherein the at least one wireless unit has a lowest QoS priority as compared to other wireless units targeted with data during the transmit period.

* * * * *